US008616066B2

(12) United States Patent
Sprenger et al.

(10) Patent No.: US 8,616,066 B2
(45) Date of Patent: Dec. 31, 2013

(54) ELECTRONIC READOUT FOR PISTON-TYPE DIFFERENTIAL PRESSURE GAUGE

(75) Inventors: Gregory S. Sprenger, Evergreen, CO (US); Michael J. Gish, Colorado Springs, CO (US); Jeff Gibson, Colorado Springs, CO (US)

(73) Assignee: Parker-Hannifin Corporation, Cleveland, OH (US)

( * ) Notice: Subject to any disclaimer, the term of this patent is extended or adjusted under 35 U.S.C. 154(b) by 272 days.

(21) Appl. No.: 13/208,763

(22) Filed: Aug. 12, 2011

(65) Prior Publication Data

US 2012/0036937 A1  Feb. 16, 2012

Related U.S. Application Data

(60) Provisional application No. 61/372,896, filed on Aug. 12, 2010.

(51) Int. Cl.
*G01L 7/16* (2006.01)

(52) U.S. Cl.
USPC ............................................. 73/744

(58) Field of Classification Search
None
See application file for complete search history.

(56) References Cited

U.S. PATENT DOCUMENTS

| | | | |
|---|---|---|---|
| 2,948,151 A | 8/1960 | Astl | |
| 2,963,563 A | 12/1960 | Patterson | |
| 3,164,989 A | 1/1965 | Busillo et al. | |
| 3,364,897 A * | 1/1968 | Mouwen | 165/80.3 |
| 3,564,175 A * | 2/1971 | Cooper | 200/82 R |
| 4,181,835 A * | 1/1980 | Stadler et al. | 200/82 E |
| 4,279,162 A * | 7/1981 | Neill et al. | 73/746 |
| 4,365,406 A * | 12/1982 | Neill et al. | 29/593 |
| 4,481,806 A * | 11/1984 | Schad | 73/1.22 |
| 4,877,927 A * | 10/1989 | Reneau | 200/61.45 M |
| 4,980,526 A * | 12/1990 | Reneau | 200/61.45 M |
| 5,091,716 A | 2/1992 | Nelson et al. | |
| 6,978,670 B2 * | 12/2005 | Cousineau | 73/146.8 |
| 7,226,212 B2 * | 6/2007 | Neumann | 384/119 |
| 7,251,994 B2 * | 8/2007 | Maldonado et al. | 73/146.8 |
| 7,770,475 B2 * | 8/2010 | Magnussen et al. | 73/864.13 |
| 7,788,986 B2 * | 9/2010 | Magnussen et al. | 73/864.16 |
| 7,819,030 B2 * | 10/2010 | Magnussen et al. | 73/864.16 |
| 8,002,748 B2 * | 8/2011 | Donovan et al. | 604/154 |
| 8,397,593 B2 * | 3/2013 | Petrek et al. | 73/864.18 |
| 2008/0164970 A1 | 7/2008 | Malzahn | |
| 2009/0007626 A1 * | 1/2009 | Bochen et al. | 73/1.68 |

* cited by examiner

*Primary Examiner* — Lisa Caputo
*Assistant Examiner* — Jermaine Jenkins
(74) *Attorney, Agent, or Firm* — Fraser Clemens Martin & Miller LLC; J. Douglas Miller

(57) ABSTRACT

A piston-type differential pressure gauge provides an electronic output for remote monitoring. A linear potentiometer, in communication with a magnetic portion of the piston of the gauge, tracks the location of the piston. Resistance change in the potentiometer can be used by an electronic circuit to provide the electronic output of the differential pressure remotely to a data acquisition system or control electronics.

20 Claims, 2 Drawing Sheets

ELECTRONIC READOUT FOR PISTON-TYPE DIFFERENTIAL PRESSURE GAUGE

CROSS-REFERENCE TO RELATED APPLICATION

The present application claims the benefit of U.S. Provisional Patent Application Ser. No. 61/372,896 filed on Aug. 12, 2010, hereby incorporated herein by reference in its entirety.

FIELD OF THE INVENTION

The present technology relates generally to a piston-type differential pressure gauge, with attached linear potentiometer, for electronic output of differential pressure.

BACKGROUND OF THE INVENTION

This section provides background information related to the present disclosure which is not necessarily prior art.

Filters are commonly used in various applications to ensure that a liquid meets a certain standard of purity or cleanliness. For example, various fluids such as gasoline and hydraulic fluids can be filtered to ensure that there are no particles in the fluid that might damage an engine or a pump. In some cases, various gases such as an exhaust gas can be filtered to minimize the pollution generated by an engine. Applications in which such filters are used are numerous and include various vehicles such as airplanes, automobiles, tractors, farm equipment, construction equipment, and other machinery.

In a typical application, fluid flows through a filter, which removes foreign matter or particles from the fluid. These filtered particles accumulate in the filter element. As these particles accumulate, the filter element becomes plugged or clogged and loses its effectiveness. As a result, an amount of particulate matter in the fluid that escapes through the filter may increase to an unacceptable or hazardous level and may damage the equipment using the fluid or may allow an unacceptable level of contaminants to escape into the atmosphere.

One example of a device used to monitor the effectiveness of a filter is a differential pressure gauge. Such a gauge can be used to monitor the fluid pressure on each side of a filter element. As the filter element becomes plugged, the pressure differential across the filter increases accordingly. For example, piston-type differential pressure gauges are frequently used to monitor filter differential pressure. A user is typically required to visually monitor the reading of such gauges.

Use of electronic data acquisition systems has increased dramatically, and sensors are often required to have electronic outputs to work with these systems. Various electronic differential pressure transducers are available to provide this data. However, piston-type differential pressure gauges have a very large existing user base for monitoring filter differential pressure, particularly for aviation fuel filter uses, and these gauges do not provide electronic output for use with electronic data acquisition systems. For example, it is estimated that thousands of such gauges are currently in operation for monitoring aviation filter differential pressures.

SUMMARY OF THE INVENTION

The present technology includes systems, processes, and articles of manufacture that relate to piston-type differential pressure gauges that provide electronic output.

In some embodiments, a piston-type differential pressure gauge comprises a piston including a magnetic portion and a linear potentiometer operable to sense a position of the magnetic portion of the piston and provide an electronic output correlated to the position. For example, the piston type differential pressure gauge can include a non-metallic piston and a magnet adhered to the piston and movable therewith, and a linear potentiometer having a movable tab for making suitable electrical contact with electrically conductive elements thereof for varying the electrical characteristics of the potentiometer and for magnetic adherence with the magnet adhered to the piston of the pressure gauge.

In some embodiments, a piston-type differential pressure gauge configured to provide electronic output comprises a housing, piston, backing spring, high and low pressure inlets, and a linear potentiometer. The piston includes a magnetic portion and is slidably disposed within the housing and separates the housing into a high pressure side and a low pressure side. The backing spring is disposed within the housing and operable to engage the piston on the low pressure side. A high pressure inlet is coupled to the high pressure side of the housing and a low pressure inlet is coupled to the low pressure side of the housing. The linear potentiometer is coupled to the housing and is operable to sense a position of the magnetic portion of the piston and provide an electronic output correlated to the position.

In some embodiments, a method of providing a differential pressure measurement of a fluid includes providing a piston-type differential pressure gauge coupled to a high pressure source and a low pressure source of the fluid. The gauge comprises a piston including a magnetic portion and a linear potentiometer operable to sense a position of the magnetic portion of the piston and provide an electronic output correlated to the position. The electronic output from the linear potentiometer is correlated to a differential pressure measurement using an electronic data acquisition system configured to receive the electronic output.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. In respect of the methods disclosed, the steps presented are exemplary in nature, and thus, the order of the steps is not necessary or critical.

The present technology relates to devices and methods for providing an electronic output for piston-type differential pressure gauges that can be used to monitor filter differential pressures, for example, such as those used in aviation fuel filters. Incorporating an electronic output for the piston-type device provides an effective upgrade for this established class of gauges. The present technology includes new piston-type differential pressure gauges providing electronic output and includes retrofitting existing hardware, with minimal part replacement, to provide electronic output and thereby affords continuity to users and a cost-effective approach to providing electronic differential pressure monitoring.

Generally, a piston-type differential pressure gauge can measure a pressure differential based on the motion of a close fitting piston balanced by a spring within a housing, such as a cylinder. A higher pressure is applied to an end of the cylinder not engaging the spring and a lower pressure is applied to an end of the cylinder engaging the spring. Accordingly, the higher pressure will cause the piston to move. The spring will compress as a result, until the force required to compress the spring added to the force of the lower pressure equals the force of the higher pressure. The distance that the piston travels can be measured and can be calibrated in terms of a pressure differential to provide a reading of the difference between the high and low pressures.

Figure 1:
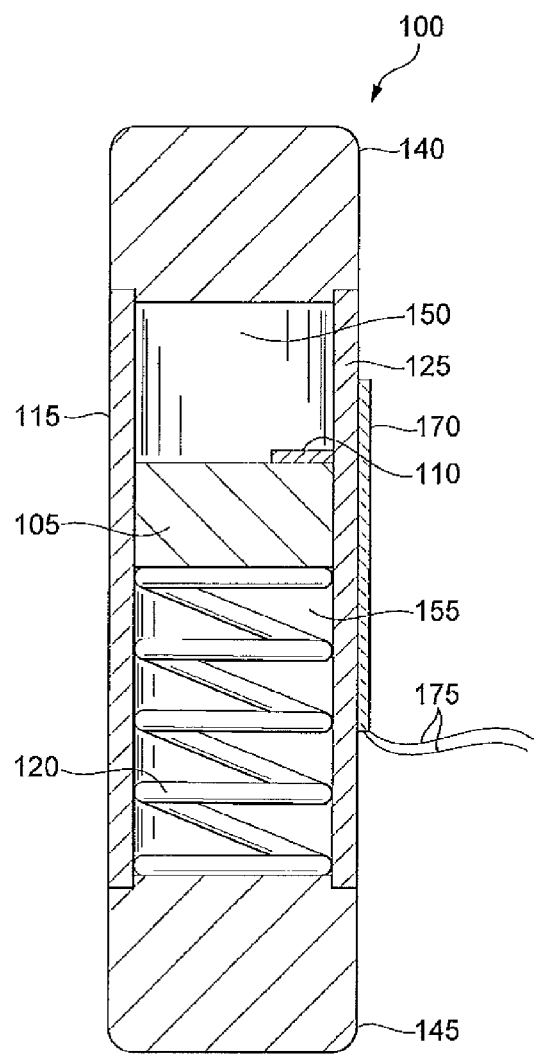
FIG. 1 is a partial cross-sectional view of an embodiment of a piston-type differential pressure gauge with electronic output capability.
Figure 2:
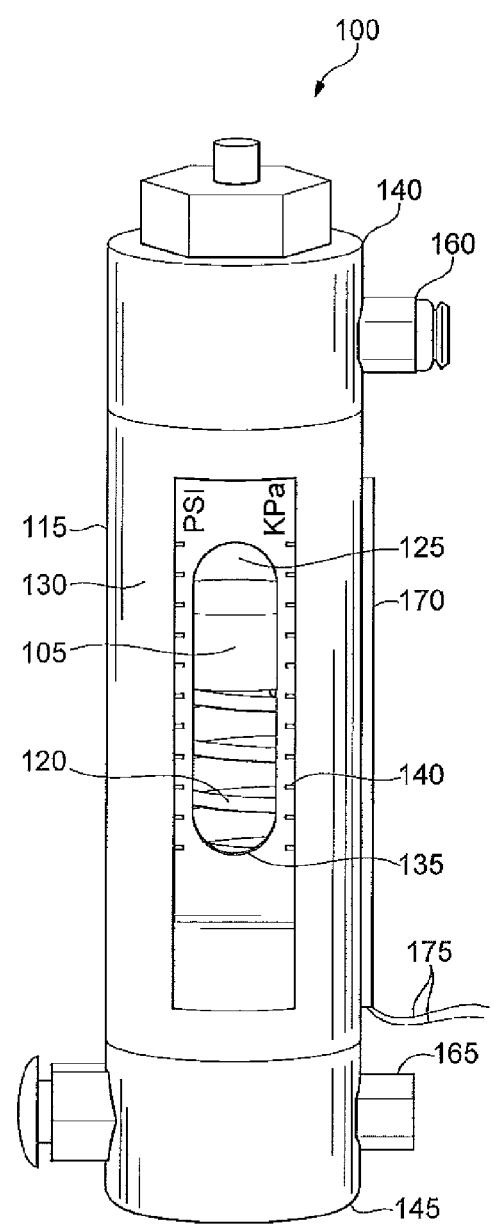
FIG. 2 is a perspective view of an embodiment of a piston-type differential pressure gauge with electronic output capability.

The present technology can include aspects of various piston-type differential pressure gauges. As illustrated in FIGS. 1 and 2, a piston-type differential pressure gauge 100 is shown that includes a piston 105 comprising a magnetic portion, where the piston 105 itself can be magnetic or can be formed of a nonmagnetic material that has a magnetic insert or magnet coupled thereto, as shown. For example, the piston may be formed of a nonmagnetic material, such a nonmagnetic metal (e.g., stainless steel) or a nonmetallic material (e.g., polymer), where a magnet 110, as shown in FIG. 1, is part of the piston or is coupled to the piston using an adhesive, press fitting, or other attachment means, The piston 105 is positioned within a housing 115 and has a backing spring 120.

The housing 115 can comprise various nonmagnetic materials, including a transparent glass tube 125 having a metal sleeve 130 disposed thereabout. The metal sleeve 130 can be a material such as stainless steel, for example. Where the housing 115 includes an opaque material, such as the metal sleeve 130, it may further include a window 135 to allow viewing of the position of the piston 105 through the glass tube 125. The housing 115 can include a graduated scale 140, for example, on the metal sleeve 130 as shown, to mark a position of the piston 105 within the housing 115. The graduated scale 140 can be calibrated to provide a differential pressure value based on the position of the piston 105.

Appropriate end assemblies 140, 145 are used to seal the housing 115, support an end of the spring 120, and provide proper plumbing connections 160, 165 or inlets to a high pressure side 150 of the piston and a low pressure side 155 (spring side) of the piston. For example, the plumbing connections 160, 165 may be coupled to the upstream and downstream sides of a fuel filter (not shown) where the gauge provides a pressure differential measurement across the filter.

The piston 105 is operable to slidingly reciprocate within the housing 115 and substantially conforms to the shape of the housing 115 to maintain a close tolerance. The outer diameter (OD) of the piston 105 and the inner diameter (ID) of the housing 115 are in close tolerance to minimize any leakage of fluid around the piston 105. For example, the clearance between the OD of the piston 105 and the ID of the housing 115 can be about 0.0003 inches or less.

The spring 120 provides a force to resist the differential pressure. The high pressure side 150 exerts a force on the piston 105 and the coupled magnet 110, thereby compressing the spring 120 until the spring force equals the differential pressure force. The axial location of the piston 105 within the housing 115 indicates the differential pressure, which may be determined using the graduated scale 140 located on or adjacent the housing 115 and by a linear potentiometer 170 coupled to the housing 115.

The linear potentiometer 170 tracks the magnetic portion of the piston 105, such as the magnet 110 coupled to the piston 105, and hence, tracks the location and movement of the piston 105 within the housing 115. Various linear potentiometers can be employed by the present technology.

In some embodiments, the linear potentiometer 170 includes a linear resistive element, a conductive path located parallel to the resistive element, and an internal magnet that provides electrical continuity between the linear resistive element and conductive path. The internal magnet is attracted to an external magnet coupled to an outer moving element. The external magnet and outer moving element in the present technology comprises the piston 105 having a magnetic portion, such as the piston 105 and coupled magnet 110 shown in FIG. 1. For example, when the piston 105 moves, the magnet 110 coupled thereto moves the internal magnet of the linear potentiometer 170 along with it, effectively moving the internal magnet axially along a portion of the length of the linear potentiometer 170. The resistance of the linear potentiometer 170 varies linearly with the position of the internal magnet 110. The linear potentiometer 170 can typically be attached to the side of the housing 115 of the piston-type differential pressure gauge 100 and an appropriate electronic connection 175 can be made from the potentiometer 170 to existing gauges or devices. The full mechanical operation of the piston-type differential pressure gauge 100 is accordingly retained in the present technology.

The linear potentiometer 170 can track motion in a contactless manner, where the magnetic portion (e.g., magnet 110) of the piston 105 is spaced apart from the linear potentiometer 170 and separated by a wall of the housing 115. The magnetic portion of the piston 105 guides the built-in magnetics (e.g., internal magnet) of the linear potentiometer 170 and can provide position output as a voltage divider. The linear potentiometer 170 can operate over the full travel of the piston 105 as a magnetic sensor to provide linear feedback relative to the position of the magnetic portion of the piston 105. Contactless communication militates against wear or exposure of the linear potentiometer 170 to the environment experienced by the piston 105.

The linear potentiometer 170 can be a membrane potentiometer. In some embodiments of the membrane potentiometer, a wiper does not make direct contact with the resistive material, but instead exerts a force through a top membrane layer through to the conductive layer, which in turn contacts the resistive layer. This approach can yield a much higher life cycle (in the millions), all within an environmentally sealed package. Membrane potentiometers can operate in a contactless manner so that no mechanical contact between the wiper and the resistive material is required. This is accomplished by using an external magnet (the piston 105 having a magnetic portion) and integrating a metallic layer into the membrane potentiometer. The conductive layer of the membrane potentiometer is pulled into contact with the resistive layer by the magnetic force between the external magnet and the metallic layer. The membrane potentiometer can also have an overall thickness of about 1 mm or less. The low profile allows for a self-adhesive backing, thereby accommodating a wide variety of mounting options.

Membrane linear potentiometers are available from Metallux USA (Rochester, N.Y. USA), Sensofoil, Hoffman+ Krippner (Peachtree, Ga. USA), and State Electronics Parts Corp. (East Hanover, N.J. USA).

The linear potentiometer 170 can also comprise a sealed potentiometer, where the conductive and resistive traces of the potentiometer are contained within a sealed channel formed of a nonconductive material. The electrical gap between the conductive and resistive traces is bridged by a magnetically reactive contactless tap. A magnetic force is applied to the tap through the surface of the channel holding the conductive and resistive traces. This provides a drawing magnetic force to the tap, which pulls the tap against the traces and allows for changing the resistance of the potentiometer by laterally moving the tap along the traces as the tap moves to follow the motion of the external force.

An example of a particular sealed potentiometer that can be used in the present technology is manufactured by Spectra Symbol Corp. (Salt Lake City, Utah USA) and sold under the trademark MAGNETOPOT. This potentiometer is a sealed potentiometer, in the membrane potentiometer configuration, that does not require a wiper/actuator to connect the collector and the resistor. Instead, the potentiometer is controlled by an external magnet (i.e., the magnetic portion of the piston 105, such as magnet 110), which attracts the magnetic forces within the potentiometer to connect to the linear resistor and give linear potentiometer feedback. A wiper inside a sealed pot is magnetic or ferromagnetic, and will only perform if connected with the external magnet. The potentiometer can be made of polyester, fiberglass and kapton, or other materials depending on its operating environment. It can function as a voltage divider, a resistor or rheostat, as desired by an end-user. By bringing the external magnet into a proximity necessary to connect with the internal magnetic attractors, the potentiometer can provide linear position sensing based on the location of the external magnet. As the external magnet moves, so does the electrical output of the potentiometer. The potentiometer is not mounted to a ferromagnetic surface. Suitable sealed potentiometers of this type are further described in U.S. Pat. Appl. Pub. No. 2008/0164970 to Malzahn, which is incorporated herein by reference.

Figure 3:
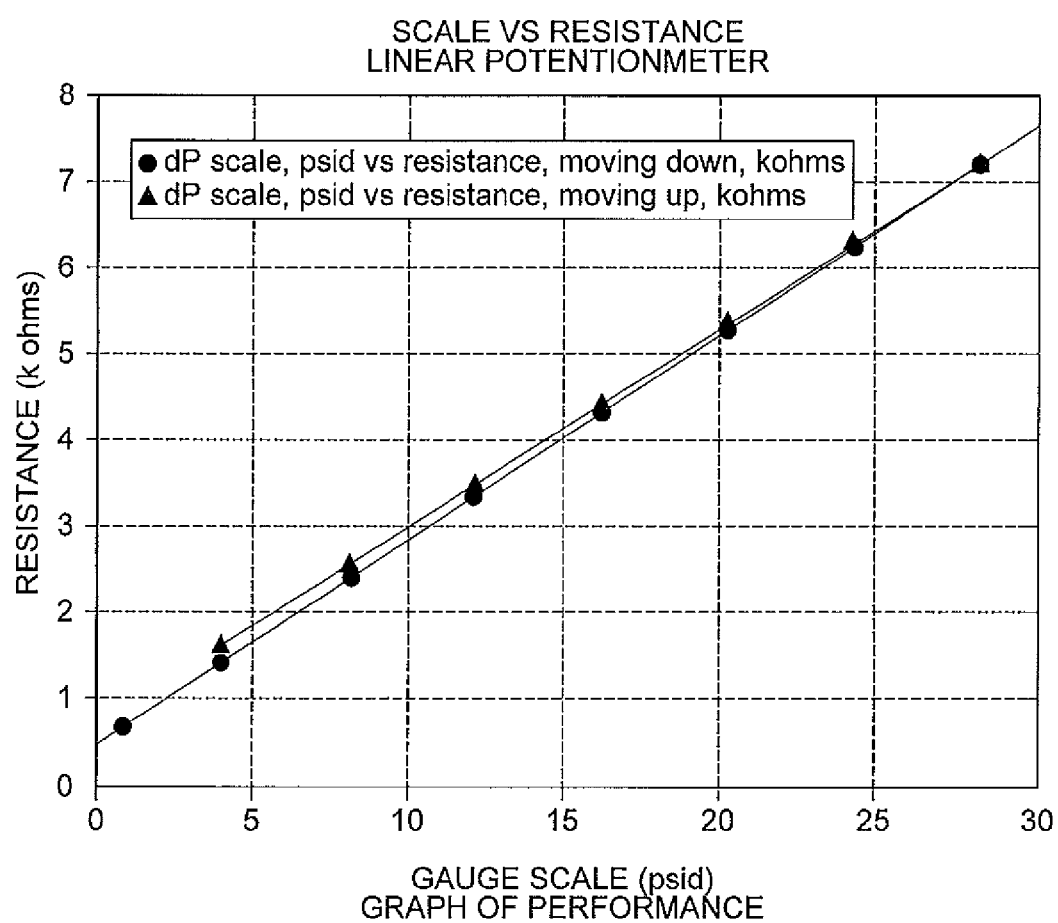
FIG. 3 is a graphical depiction of differential pressures illustrating the linear relationship between gauge scale pressure (psid) and resistance measured by a linear potentiometer.

Resistance change, as measured by the linear potentiometer 170, can be correlated with a differential pressure value as illustrated in FIG. 3. Accordingly, the resistance change of the linear potentiometer 170 provides an electronic output for indicating the differential pressure measured by the piston-type differential pressure gauge. Gauges so configured can be used to measure and electronically output various values and ranges, for example, including up to 30 pounds per square inch (psid) of differential pressure. In this way, the electronic output enables a remote reading of the gauge that can be interfaced with an electronic data acquisition system so that a user is not required to visually observe the gauge. Thus, new or retrofitted piston-type differential pressure gauges according to the present technology can be remotely monitored.

It should be noted that electronic output of the linear potentiometer 170 allows the piston-type differential pressure gauge 100 to be configured without a window 135 to view the piston 105 relative to a graduated scale 140, as desired or dictated by application. In this manner, the housing 115 can comprise an entirely opaque material, such as stainless steel. For example, in certain applications, the present piston-type differential pressure gauge 100 may be positioned in a system or machine where it is not readily visible or where it is constructed of materials that are necessary to withstand a particular environment and may be opaque.

The present technology further includes retrofitting existing piston-type differential pressure gauges with a piston comprising a magnetic portion and a linear potentiometer. This can be accomplished by coupling a magnet to the piston of an existing gauge and coupling a linear potentiometer to the tube housing the piston. In some cases, retrofitting may include replacing the piston of an existing gauge with a new piston having a magnet coupled thereto. For example, the piston may be replaced where an existing gauge has a piston comprising a magnetic material or a material that would interfere with the linear potentiometer, or where the piston design does not permit coupling of the magnet in a position that can travel coextensively with the position of the linear resistive element of the linear potentiometer.

Commercial examples of piston-type differential pressure gauges that can be fitted with a piston coupled magnet and a linear potentiometer include: Gammon Technical Products, Inc. (Manasquan, N.J.) GTP-534-15A Aluminum 0 to 15 PSID, or GTP-534-30S Stainless Steel 0 to 30 PSID Differential Pressure Gauges, among other examples as provided online at [www.gammontechstore.com].

In addition to differential pressure monitoring, electronic output of the present piston-type differential pressure gauges 100 can be used for other monitoring uses, such as triggering filter cartridge changeout, when coupled with a flow differential pressure monitor, such as the FDPM® device (Velcon Filters, LLC, Colorado Springs, Colo. USA).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A piston-type differential pressure gauge comprising:
    a piston including a magnetic portion; and
    a linear potentiometer operable to sense a position of the magnetic portion of the piston and provide an electronic output correlated to a position of the piston throughout a range of travel of the piston, the electronic output varying linearly with the position of the piston.

2. The piston-type differential pressure gauge of claim 1, wherein the magnetic portion comprises a magnet coupled to the piston.

3. The piston-type differential pressure gauge of claim 1, wherein the electronic output is a resistance value.

4. The piston-type differential pressure gauge of claim 1, further comprising an electronic data acquisition system operable to receive and correlate the electronic output from the linear potentiometer to a differential pressure value.

5. The piston-type differential pressure gauge of claim 1, wherein the gauge includes a transparent window to observe the position of the piston and a graduated scale correlating the position of the piston to a differential pressure value.

6. The piston-type differential pressure gauge of claim 1, wherein the gauge is configured to be coupled to high and low pressure sides of a fuel filter.

7. The piston-type differential pressure gauge of claim 1, wherein the linear potentiometer is configured to operate in a contactless manner.

8. A piston-type differential pressure gauge configured to provide an electronic output, the gauge comprising:
   a housing;
   a piston slidably disposed within the housing and separating the housing into a high pressure side and a low pressure side, the piston comprising a magnetic portion;
   a backing spring disposed within the housing and operable to engage the piston on the low pressure side;
   a high pressure inlet in fluid communication with the high pressure side of the housing;
   a low pressure inlet in fluid communication with the low pressure side of the housing; and
   a linear potentiometer coupled to the housing, the linear potentiometer operable to sense a position of the magnetic portion of the piston and provide an electronic output correlated to a position of the piston throughout a range of travel of the piston, the electronic output varying linearly with the position of the piston.

9. The piston-type differential pressure gauge of claim 8, wherein the magnetic portion comprises a magnet coupled to the piston.

10. The piston-type differential pressure gauge of claim 8, wherein the linear potentiometer comprises a membrane potentiometer.

11. The piston-type differential pressure gauge of claim 10, wherein the linear potentiometer is configured to operate in a contactless manner.

12. The piston-type differential pressure gauge of claim 8, wherein the linear potentiometer comprises a sealed potentiometer.

13. The piston-type differential pressure gauge of claim 8, wherein the electronic output is a resistance value.

14. The piston-type differential pressure gauge of claim 8, further comprising an electronic data acquisition system operable to receive and correlate the electronic output from the linear potentiometer to a differential pressure value.

15. The piston-type differential pressure gauge of claim 8, wherein the housing comprises a glass tube and a graduated scale correlating the position of the piston to a differential pressure value.

16. The piston-type differential pressure gauge of claim 8, wherein the high pressure inlet is configured to be coupled to a high pressure side of a fuel filter and the low pressure inlet is configured to be coupled to the low pressure side of the fuel filter.

17. A method of providing a differential pressure measurement of a fluid comprising:
   providing a piston-type differential pressure gauge comprising a piston including a magnetic portion, and a linear potentiometer operable to sense a position of the magnetic portion of the piston and provide an electronic output correlated to a position of the piston throughout a range of travel of the piston, the electronic output varying linearly with the position of the piston, the gauge coupled to a high pressure source and a low pressure source of the fluid;
   correlating the electronic output from the linear potentiometer to a differential pressure measurement using an electronic data acquisition system configured to receive the electronic output.

18. The method of claim 17, wherein the high pressure source comprises a high pressure side of a fuel filter and the low pressure source comprises a low pressure side of the fuel filter.

19. The method of claim 18, wherein the electronic data acquisition system indicates a fuel filter changeout is necessary based on a threshold differential pressure measurement.

20. The method of claim 17, further comprising retrofitting an existing piston-type differential pressure gauge with the piston including a magnetic portion and the linear potentiometer operable to sense a position of the magnetic portion of the piston and provide an electronic output correlated to the position of the piston.

* * * * *